United States Patent [19]
Hoffman

[11] Patent Number: 5,335,617
[45] Date of Patent: Aug. 9, 1994

[54] SANITARY DOG KENNEL

[76] Inventor: Oneal M. Hoffman, Rte. 2 Box 350, St. Matthews, S.C. 29135-9566

[21] Appl. No.: 79,017

[22] Filed: Jun. 18, 1993

[51] Int. Cl.⁵ .............................................. A01K 1/02
[52] U.S. Cl. ........................................................ 119/17
[58] Field of Search ........................ 119/19, 17, 28, 15

[56] References Cited

U.S. PATENT DOCUMENTS

| | | | |
|---|---|---|---|
| 2,665,664 | 1/1954 | Benjamin | 119/28 |
| 3,177,848 | 4/1965 | Rubricius | 119/17 |
| 3,292,582 | 12/1966 | Rubricius | 119/17 |
| 3,550,558 | 12/1970 | Sachs | 119/28 X |
| 3,731,657 | 5/1973 | Alessio | 119/19 X |
| 3,884,188 | 5/1975 | Arends | 119/28 X |
| 4,332,214 | 6/1982 | Cunningham | 119/19 X |
| 4,696,259 | 9/1987 | Fewox | 119/19 |
| 4,998,506 | 3/1991 | Frostad | 119/19 X |

Primary Examiner—Thomas Price
Attorney, Agent, or Firm—Michael A. Mann

[57] ABSTRACT

An apparatus for use in the housing of dogs includes a molded fiberglass flooring, fencing and a top. The apparatus is movable and sanitary, and can be used in a modular fashion with standard-sizes of fencing that can be shared in part by adjacent modules. The fiberglass flooring has rimmed sides that act as "splash guards" and a trough with a drain at one end outside the fencing for flushing animal wastes into a sewage system. The bottom of the fiberglass flooring is reinforced by a plurality of ribs running parallel to the sides and toward the trough. The top of the fiberglass flooring is textured in lanes, also running parallel to the sides of the flooring and perpendicular to the trough, to provide the animal with a non-abrasive, non-slip surface, that is easy to clean, stain-resistant, non-porous, waterproof and rigid.

18 Claims, 3 Drawing Sheets

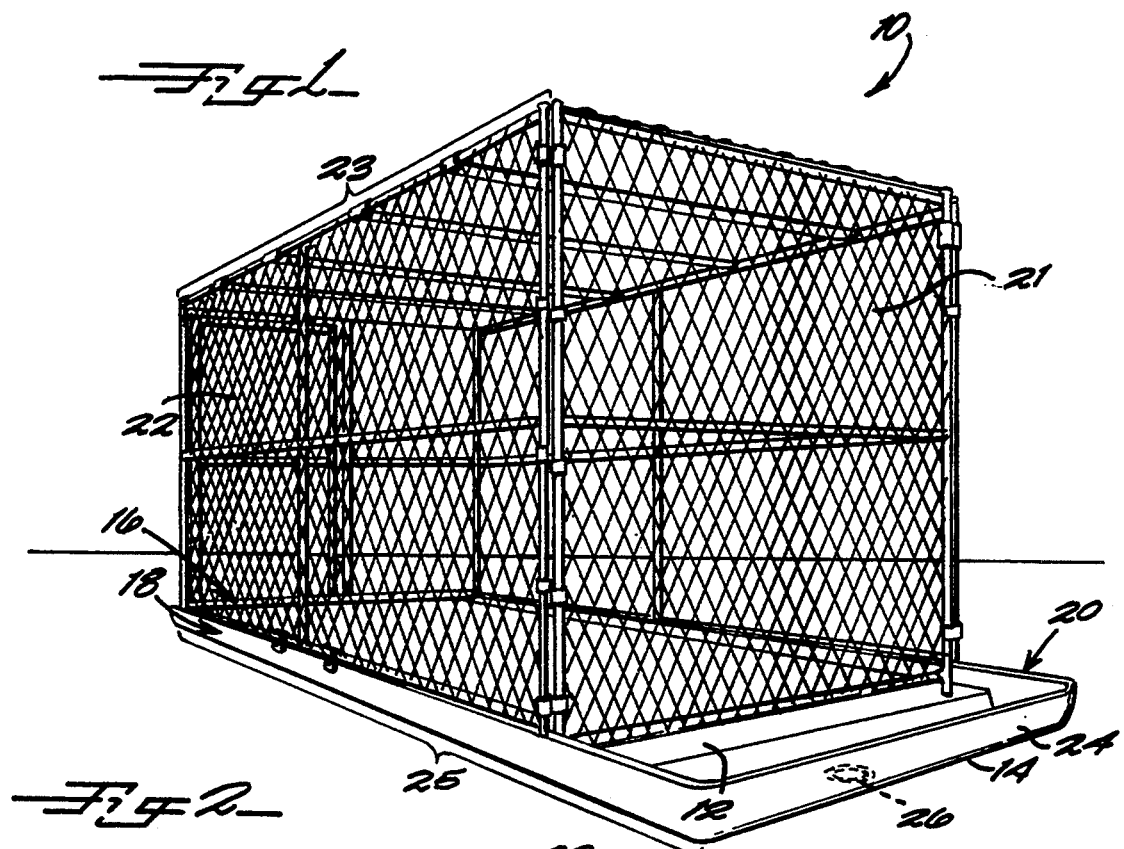
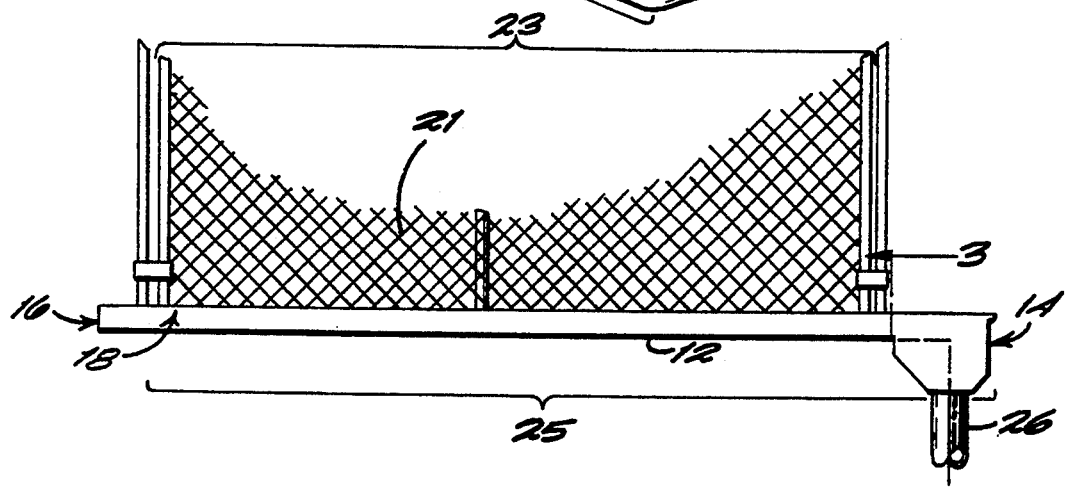
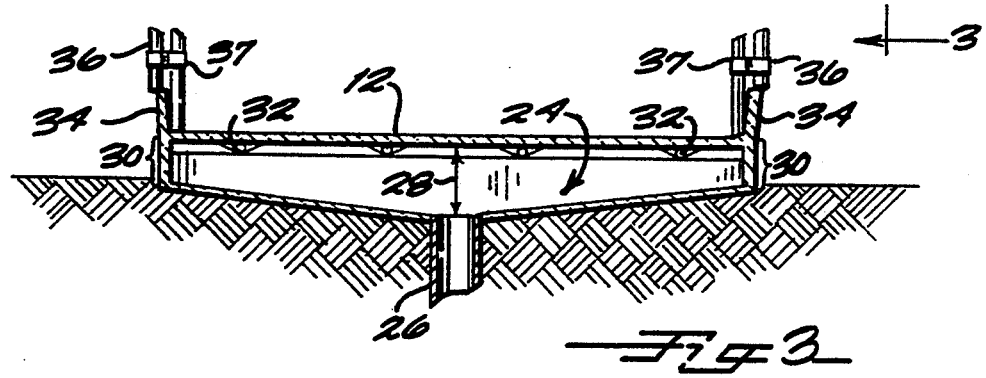

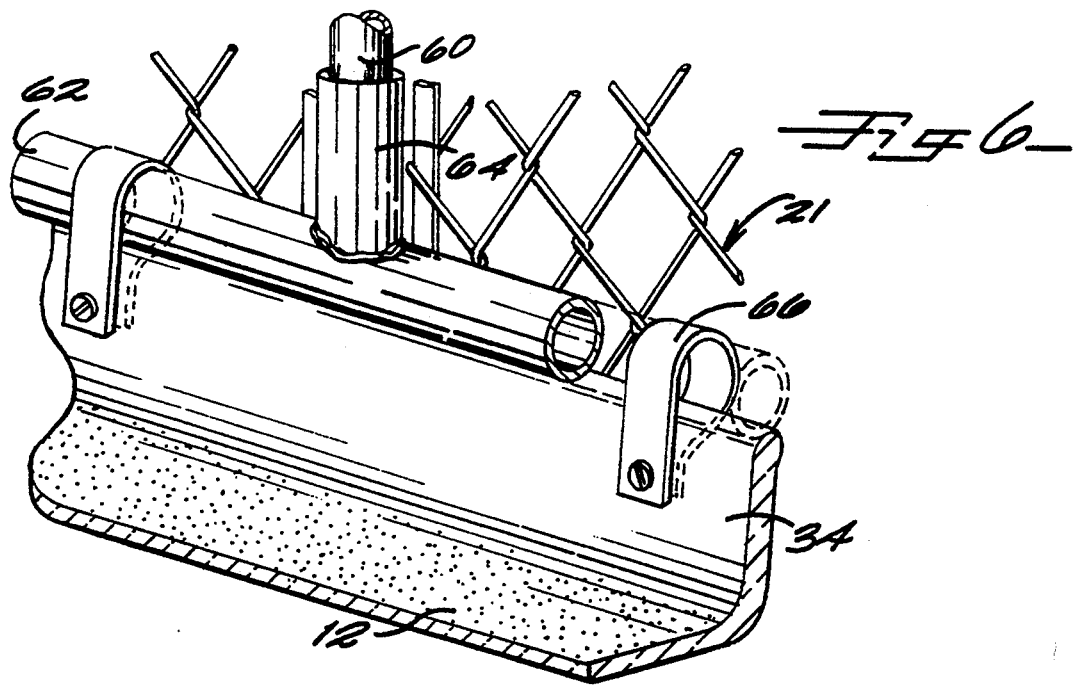
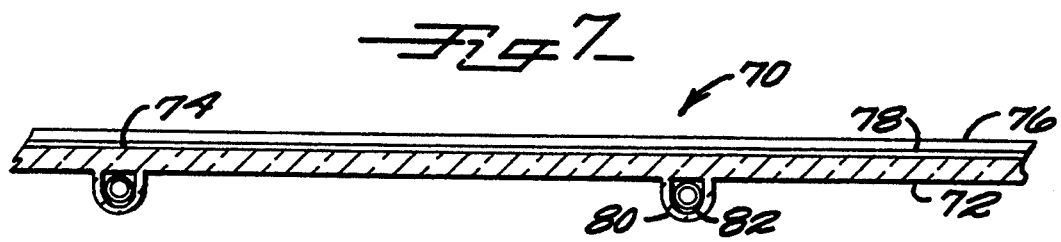
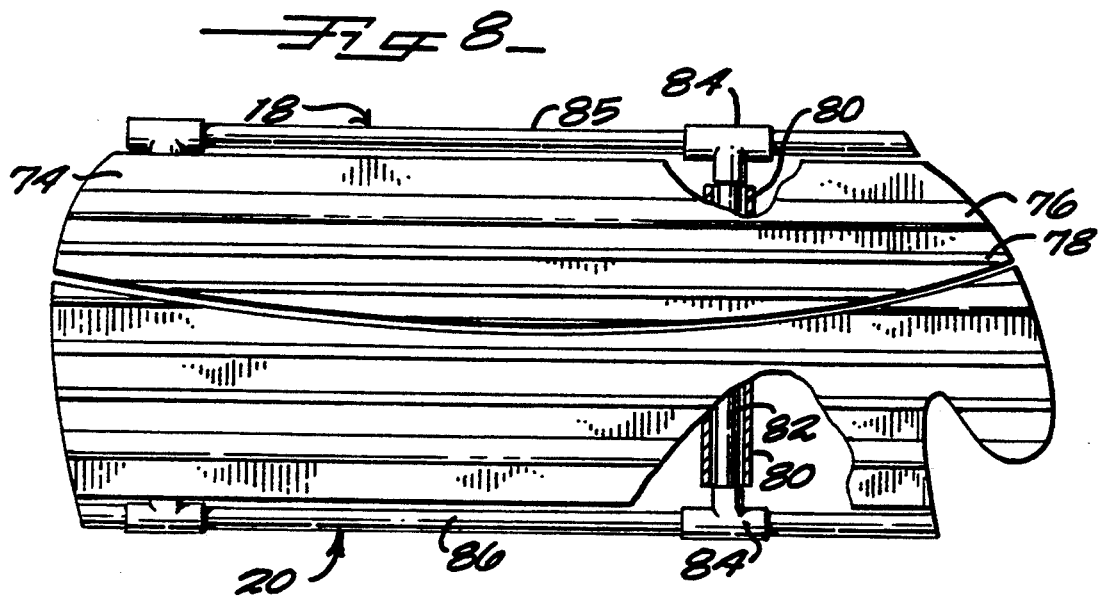

SANITARY DOG KENNEL

BACKGROUND OF THE INVENTION

1. Field of the Invention:

The present invention relates to a device for keeping a dog. More specifically, the invention relates to a dog kennel comprising a sanitary surface, fencing and a top secured to the fencing that forms a shelter for the animal.

2. Discussion of Background:

Many devices exist for housing dogs. Most of these are in the form of kennels for one or more dogs that employ the use of concrete as the foundation, while the sides are chain link fence. There are two problems associated with such kennels: the surface cannot be adequately cleaned and it is immobile.

Once the concrete foundation is laid, it becomes a permanent structure and thereafter it is impossible for the dog owner to transport the kennel to a new location. Furthermore, if the kennel is no longer required, and the side fencing is disassembled, there remains a concrete base. This concrete foundation is a visual nuisance and often devalues the land on which it is situated, and therefore, destruction of the concrete foundation is usually required. Removal of the concrete foundation, including breaking it up, loading it and disposing of it, is neither easy nor inexpensive.

Because they are not easily cleaned, concrete foundations contribute to a variety of sanitary problems that confront a dog owner. To provide for the removal of waste generated by the dog, many kennels are equipped with a drain located within the enclosed area. When a concrete foundation is laid, it is sloped at an angle such that when the waste is to be removed, the interior of the kennel can be hosed with water to drive the waste to the drain. However, it is rare that the actual foundation is engineered; rather, it is simply laid out with a simple wood form and the concrete poured. As a result, when the concrete sets, it often contains surface irregularities or "pockets" which can trap the waste water in puddles and thereby provide standing water for bacteria carrying disease to live. Specifically, this problem often results in kennel dogs contracting Giardia, a contagious parasitic disease which thrives in standing water.

Furthermore, concrete is a porous material and is susceptible to cracking as it cures and settles, both conditions which provide a refuge for germs and disease. The porous, brittle nature of concrete foundations contributes to unclean kennel conditions. When dogs are housed in adjacent kennels, these conditions frequently lead to serious, easily-spread and sometimes fatal canine diseases such as tapeworms, Parvo and Giardia. Therefore, there is a need for a kennel foundation that can be cleaned easily and thoroughly.

Concrete foundations also detract from the appearance of a kennel because stains caused by animal defecation and urination cannot be removed. Additionally, concrete causes fur loss at areas that repeatedly contact the concrete, such as elbows, thereby diminishing the appearance of the animal, especially show dogs.

Many designs employ a waste drain inside the kennel. These drains usually contain a surface residue of both liquid and solid waste. By placing the drain within the kennel, the animal has an opportunity to tamper with its waste, or the waste of the animal previously in the kennel, and thereby increase its exposure to contagious disease. When a kennel floor is washed with a hose, feces from one pen can be splattered into an adjacent pen, thereby contributing to the spread of disease. The significance of this biologically hazardous exposure, and the potential for exposure of multiple animals, is especially important when considering a kennel that houses many animals in a given day, such as a veterinarian's kennel. It is well known that animals kept at a veterinary hospital are more susceptible contracting disease, due to kennel conditions and the proximity of animals to one another.

Given these conditions, there exists a demand for a kennel that employs a mobile, easily-installed, easily-cleaned and non-abrasive foundation with a waste drain that is beyond the animal's reach.

SUMMARY OF THE INVENTION

According to its major aspect and briefly described, the present invention is an apparatus for use in housing dogs. The apparatus comprises a molded fiberglass flooring, fencing that is secured to the flooring, and a top that covers the fencing. The flooring has two sides and a first and second end. Both sides and the first end have a rim, and the first end also has a trough with a drain for receiving and conducting away animal waste. The fencing extends along the sides and across both ends of the flooring. There is a door included in the fencing at the second end, away from the second end of the flooring. The fencing extending from first end is spaced a distance from the trough so that the trough and drain are outside the area of the flooring enclosed by the fencing. The fencing has vertical support posts that rest on the rim of the flooring and horizontal posts that connect the vertical posts. There is a molded fiberglass top that covers the fenced portion of the flooring.

The fencing and fiberglass flooring and top allow the kennel to be used in a modular fashion, in side-by-side relationship with other similar flooring with fencing shared by adjacent kennels, the support posts of the shared fencing resting on the rims of the adjacent flooring units. The fiberglass flooring and top are reinforced with ribs molded into them; the top of the flooring is textured in lanes for traction and both flooring and top are coated with Gelcoat TM to provide smooth, aesthetically pleasing and matching finishes. Both the ribs and lanes of the flooring run perpendicular to the first and second ends of the flooring.

A major feature of the present invention is the prefabricated flooring that obviates a need for special installation. The present kennel is therefore easy to install and easy to move to a new location. The flooring may be laid on sand, gravel or earth, or placed on blocks to keep it off the ground; no permanent structure need be constructed and no heavy equipment used. If a dog owner moves, the kennel can be moved, too.

Another very important feature of the present invention is the use of fiberglass as a flooring. Fiberglass is non-porous, waterproof and stain-resistant, and therefore it is easy to clean, will not support bacteria or viri, and it will maintain its appearance. It can also be molded at a factory, and inspected there so that there are no cracks, flaws, or puddle-forming depressions in the surface as delivered that might harbor bacteria. Also, the flooring and top can be made in a variety of colors. Preferably, the flooring and top will be made of a light color for two reasons. First, a light color reflects light and will prevent the kennel from becoming as hot as a dark colored flooring. Second, a light colored floor will allow the owner to detect blood that might indicate the animal is in heat or ill. The top of the fiberglass flooring is textured so that the dog may have a tractioned surface to walk on, yet fiberglass is non-abrasive and will not irritate the dog as concrete will.

Still another feature of the present invention relates to its sanitary nature is the molded trough, drain and rim. The trough and drain are positioned outside the fenced area. As a result, the waste residue in both the trough and the drain cannot be reached by the dog once it is washed out of the fenced area. Because the drain is outside the fenced area, it need not be covered with a grid to protect the animal and can be dimensioned so that fecal material is easily washed down. This feature will reduced an animal's exposure to contagious canine diseases that are often contracted through contact with animal wastes. Similarly, the rimmed sides of the foundation provide further protection for the animal. The rimmed sides act as "splash guards" and limit the possibility of waste from one kennel from entering an adjacent kennel and to help to channel the waste to the drain rather than over the edges of the flooring.

Yet another feature of the present invention is the modular nature of construction. The flooring is dimensioned to house one animal but any number of floorings can be placed in adjacent relationship to house as many animals as desired. The width of the flooring is dimensioned in particular so that side fencing can be shared by adjacent pens. If, however, it is preferred that the animals in adjacent pens not be able to touch noses and paws, the side fencing posts can be rotated to fit inside the rims where the individual, separated fencing of adjacent pens will prevent animal-to-animal contact.

An addition feature of the present invention is the molded, reinforced fiberglass top. The top is secured to the kennel fencing to prevent it from separating from the kennel during a storm and further protects the animal from inclemate weather, predators, other dogs and thieves.

Other features and advantages will be apparent to those skilled in the art of keeping dogs from a careful reading of the Detailed Description of Preferred Embodiments, accompanied by the drawings.

BRIEF DESCRIPTION OF THE DRAWINGS

In the drawings,

FIG. 1 is a perspective view of a kennel according to a preferred embodiment of the present invention;

FIG. 2 is a side view of a kennel according to a preferred embodiment of the present invention;

FIG. 3 is a detailed cross-sectional view taken along line 3—3 of FIG. 2;

FIG. 6 is a detailed perspective view of the attachment of the fencing to the flooring according to a preferred embodiment of the present invention;

FIG. 7 is a side, cross-sectional view of the top of the kennel according to a preferred embodiment of the present invention; and FIG. 8 is a top view, partially cut away of the top of the kennel.

DETAILED DESCRIPTION OF A PREFERRED EMBODIMENT

Figure 4:
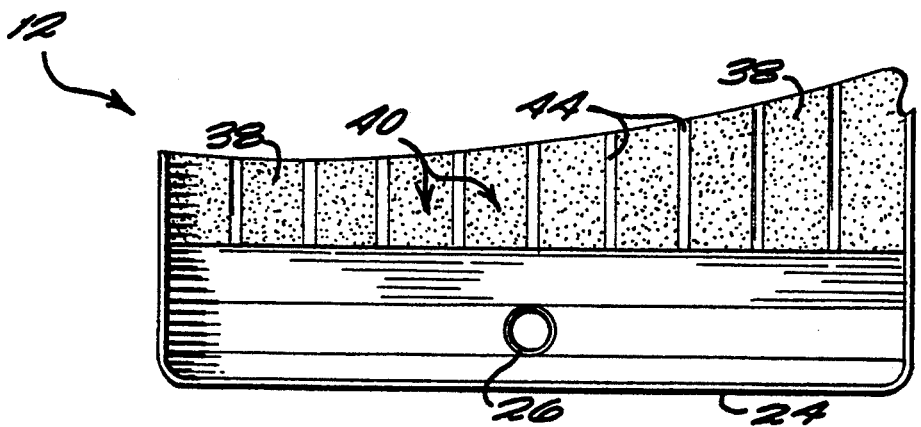
FIG. 4 is a detailed top view of the present invention illustrating the trough and drain.

The present invention is an apparatus for use in housing dogs. FIG. 1 shows the apparatus in perspective and generally indicated by reference numeral 10. In a preferred embodiment, apparatus 10 comprises a molded fiberglass flooring 12, having a front end 14, a rear end 16, and sides 18 and 20. Apparatus 10 further comprises a top 70 (best seen in FIGS. 7 and 8), and fencing 21 which extends from both sides 18 and 20 and ends 14 and 16. Fencing 21 located at rear end 16 contains a door 22. Molded fiberglass flooring 12 further comprises a trough 24 with a drain 26 at front end 14. Fiberglass flooring 12 can be manufactured for use with any standard size kennel fencing.

As seen in FIG. 1 and 2, the distance 23, representing the length of fencing 21 between front end 14 and rear end 16, is less than distance 25, representing the length of fiberglass flooring 12. Therefore, trough 24 and drain 26 are located beyond fencing 21 at front end 14. As a result, exposure to disease will be minimized because the dog is housed within fencing 21 and will be unable to tamper with any waste residue remaining in trough 24 and drain 26.

Drain 26 is located in the center of trough 24, as shown in FIG. 3. Also, trough 24 is molded such that distance 28 is greater than distance 30, thereby facilitating the evacuation of waste from trough 24 through drain 26. According to the preferred embodiment, apparatus 10 is reinforced by a plurality of ribs 32 that are incorporated into the bottom surface of flooring 12 in the molding process and run perpendicular to ends 14 and 16. Preferably, the distance from the top surface of flooring 12 to the top of drain 26 is at least 12 inches.

In addition to trough 24 and drain 26, flooring 12 is molded with rimmed sides 34. Rimmed sides 34 extend along both sides and around first end 14 to include trough 24, but not second end 16 so as not to interfere with door 22. Rimmed sides 34, preferably at least four inches high, have two functions: they act as splash guards so that waste from one kennel cannot be transferred to an adjacent kennel; and rimmed sides 34 act as means of stabilizing support bars 36. In the preferred embodiment, support bars 36 rest on both rimmed sides 34 and the rimmed sides of an adjacent module, thereby allowing fencing 21 extending from sides 18 and 20 to act as the side fencing for an adjacent module. Alternatively, hinges 37 can be used to rotate support bars 36 so that support bars 36 are fully stabilized by rimmed sides 34 of one apparatus 10.

Referring now to FIG. 4., which shows a top view of flooring 12 with trough 24 and drain 26. Preferably, flooring 12 is made of fiberglass coated with Gelcoat ™. However, any moldable, non-toxic, non-porous, non-abrasive, stain-resistant, rigid, waterproof material can be used, such as polyethylene. These material characteristics are necessary to assure a surface that does not trap waste, is easy to clean, and maintains the appearance of the animal. The surface of flooring 12 is textured 38, to provide traction for the animal, and contains a plurality of lanes 40, which make the apparatus easier to clean. Lanes are separated by gaps 44. Although flooring 12 can be manufactured in any color, the preferred embodiment is a light color for two reasons: a light color will prevent the kennel from becoming unnecessarily hot and will increase the visibility of discharges that may indicate the animal is in heat or ill.

Figure 5:
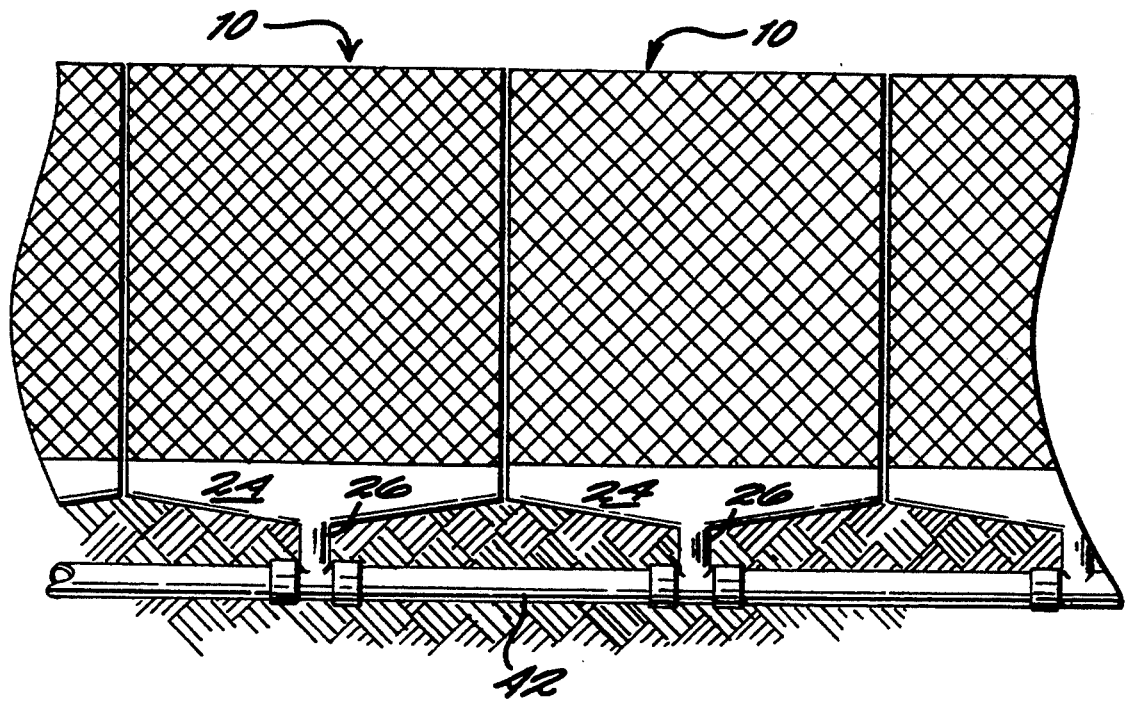
FIG. 5 is a front view showing the present invention used in a modular fashion.

According to the preferred embodiment, FIG. 5 shows apparatus 10 employed in a modular fashion, wherein each apparatus 10 is placed adjacent to another apparatus 10. When apparatus 10 is employed as a modular unit with others, drain 26 of each apparatus 10 is connected to pipe system 42, thereby minimizing the piping necessary to clean a series of kennels. As best seen in FIG. 3, support bars 36 in conjunction with rimmed sides 34 provide a distance between adjacent apparatus 10, thus preventing physical contact between dogs housed in adjacent apparatus 10.

FIG. 6 shows the securing means by which fencing 21 is secured to flooring 12. Vertical side fence post 60 is connected by welding to horizontal side fence post 64. Flooring 12 is fastened to fencing 21 by a plurality of J-hooks 66 bolted or screwed into rimmed sides 34. J-hooks 66 wrap completely around side fence piping 62 to secure fencing 21 to flooring 12.

FIGS. 7 and 8 show top 70 having a bottom surface 72 and a top surface 74. Top surface 74 of top 70 is coated with Gelcoat TM and contains a plurality of larger ribs 76 spaced 9¾" inches apart with two smaller ribs 78 spaced 2¼" apart between every two larger ribs. Larger ribs 76 and smaller ribs 78 provide rigidity for top 70. Ribs 76, 78 run lengthwise, that is, parallel to sides 18 and 20.

The bottom surface 72 of top 70 employs a plurality of hollow tubes 80 perpendicular to sides 18 and 20 (FIG. 8). Tubes 80 are designed to accept top fence piping 82. As best shown in FIG. 8, top 70 is stabilized by top fence piping 82 contained within tubes 80. Top 70 is secured to fencing 21, by a plurality of T-clamps 84 that connect top fence piping 82 to side fence piping 86 located at top of fencing 21 on sides 18 and 20. When kennels are placed side by side and share a common wall, a top 70 of one kennel will be rotated 180° with respect to a next top 70 so that tubes 80 of one are not aligned with tubes 80 of the adjacent top 70. Therefore, the T-clamps 84 securing piping 82 of adjacent kennels to fencing 21 will not interfere.

In use, a place can be prepared for receiving flooring 12 by simply raking the soil and placing flooring 12 directly on the soil. Preferably, however, sand or pea gravel can be deposited on the soil so as to provide a surface that will conform to the bottom surface ribs 32 of flooring 12. Alternatively, where it is desirable to elevate flooring 12 above the soil, flooring 12 can be placed on blocks or a temporary platform. It is important the second end 16 of flooring 12 be elevated slightly with respect to the first end 14 so that water and urine will run toward trough 24. Lanes 40 are parallel to the side and perpendicular to the trough so that the untextured spaces 44 between lanes 40 allow water to run more quickly to trough 24.

When several animals are to be housed in adjacent pens, flooring 12 should be oriented so that all troughs 24 are on the same sides and flooring 12 is in side-by-side relationship. Drains 26 of troughs 24 should then be connected by a pipe system 42 to a septic field or sewage system.

Flooring 12 is preferably molded to receive standard kennel fencing 21, such as 6'×12', 10'×10', or 8'×8'. If more than one dog is to be housed in adjacent pens of a kennel, fencing 21 on either side can be shared or each pen can have its own to space the animals out of contact range.

The kennel should be flushed with water from a hose frequently, working the hose from side to side, rim to rim and from the door end of the fencing to the trough. Finally, the trough should be hosed clean, driving with the water all wastes into the drain. Note that rimmed sides 34 runs all around trough 24, including its ends, so that flooring 12 can be used by itself or with other modular units.

It will be apparent to those skilled in the art that many modifications and substitutions can be made to the preferred embodiment just described without parting from the spirit and scope of the invention as defined by the appended claims.

What is claimed is:

1. A flooring for use in a dog kennel, said flooring comprising a molded sheet of material having a top surface that is non-porous and is textured in lanes for traction, said sheet having a first end and an opposing second end, a first side and an opposing second side, said sheet having a rim running along said first end, said first side and said second side, said sheet having a bottom surface having a plurality of ribs formed therein for reinforcing said sheet, said sheet having a trough with a drain formed at said first end, said drain dimensioned for flushing canine waste therethrough.

2. The flooring as recited in claim 1, wherein said lanes have a long dimension running perpendicular to said first and second ends.

3. The flooring as recited in claim 1, wherein said rim is at least four inches above and said drain is at least twelve inches below said top surface of said sheet.

4. The flooring as recited in claim 1, wherein said material is fiberglass.

5. A dog kennel, comprising:
   a molded, fiberglass sheet having
   a first end and an opposing second end, a first side and an opposing second side,
   a rim formed along said first end and said first and second sides of said fiberglass sheet,
   a trough with a drain formed at said first end of said fiberglass sheet,
   a top surface and a bottom surface, and
   a plurality of ribs formed in said bottom surface for reinforcing said sheet; and
   fencing supported by said rim and enclosing a portion of said sheet,
   said sheet dimensioned to extend beyond said fencing so that said trough will be outside said fencing.

6. The flooring as recited in claim 5, wherein said top surface has textured lanes, said lanes having a long dimension perpendicular to said first and said second ends.

7. The flooring as recited in claim 5, wherein said rim is at least four inches above and said drain is at least 12 inches below said top surface.

8. The flooring as recited in claim 5, wherein said fencing has support posts and said flooring is dimensioned so that said support posts will rest halfway on said rim on said first and said second sides to that, if two kennels are adjacent to each other, a first kennel of said two kennels having a second flooring, said support posts of said fencing shared by said two kennels will rest half on said first flooring and half on said second flooring.

9. The flooring as recited in claim 5, wherein said drain is centered in said trough and said trough is sloped toward said drain.

10. The flooring as recited in claim 5, wherein said drain is dimensioned to receive canine waste.

11. A modular kennel for a dog, said modular kennel comprising
   a sheet of fiberglass having a first side and an opposing second side, a first end and an opposing second end, a rim formed along said first and said second sides and said first end, and a trough with a drain formed along said first end of said sheet;
   fencing carried by said sheet and extending along said first and second sides and along said first end and said second end, extending parallel to said trough, said fencing spaced apart from said trough so that said dog is denied access to said trough by said fencing, said fencing including a door carried by said fencing along said second end; and
   a top covering said fencing,
   said modular kennel being positionable between other modular kennels.

12. The modular kennel as recited in claim 11, wherein said sheet of fiberglass has a top surface that is textured in lanes, said lanes having a major dimension perpendicular to said trough.

13. The modular kennel as recited in claim 11, wherein said sheet of fiberglass has a bottom surface, said bottom surface formed with at least one rib for reinforcing said sheet.

14. The modular kennel as recited in claim 11, wherein said drain is centered in said trough.

15. The modular kennel as recited in claim 11, wherein said sheet of fiberglass has a top surface and said drain is at least 12 inches below said top surface.

16. The modular kennel as recited in claim 11, wherein said rim is at least four inches high.

17. The modular kennel as recited in claim 11, wherein said fencing is supported by a plurality of posts, each post of said plurality of posts having a center, said sheet of fiberglass being dimensioned with respect to said fencing to run from said center of said plurality of posts on said first side to said center of said plurality of posts on a second, opposing side of said second side.

18. The modular kennel as recited in claim 11, wherein said top is made of fiberglass and has means formed therein for reinforcing said top.

* * * * *